United States Patent Office 3,272,033
Patented Sept. 13, 1966

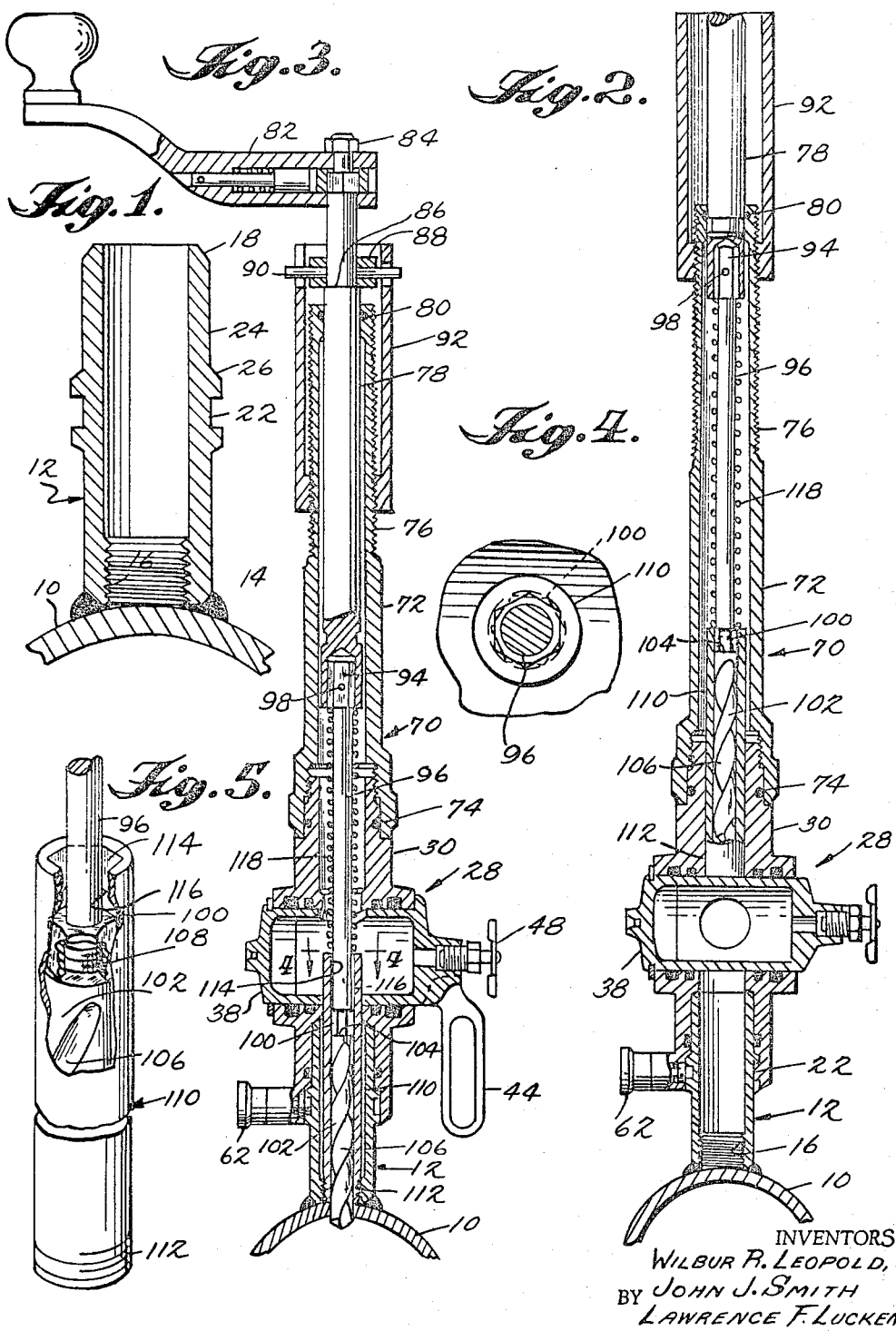

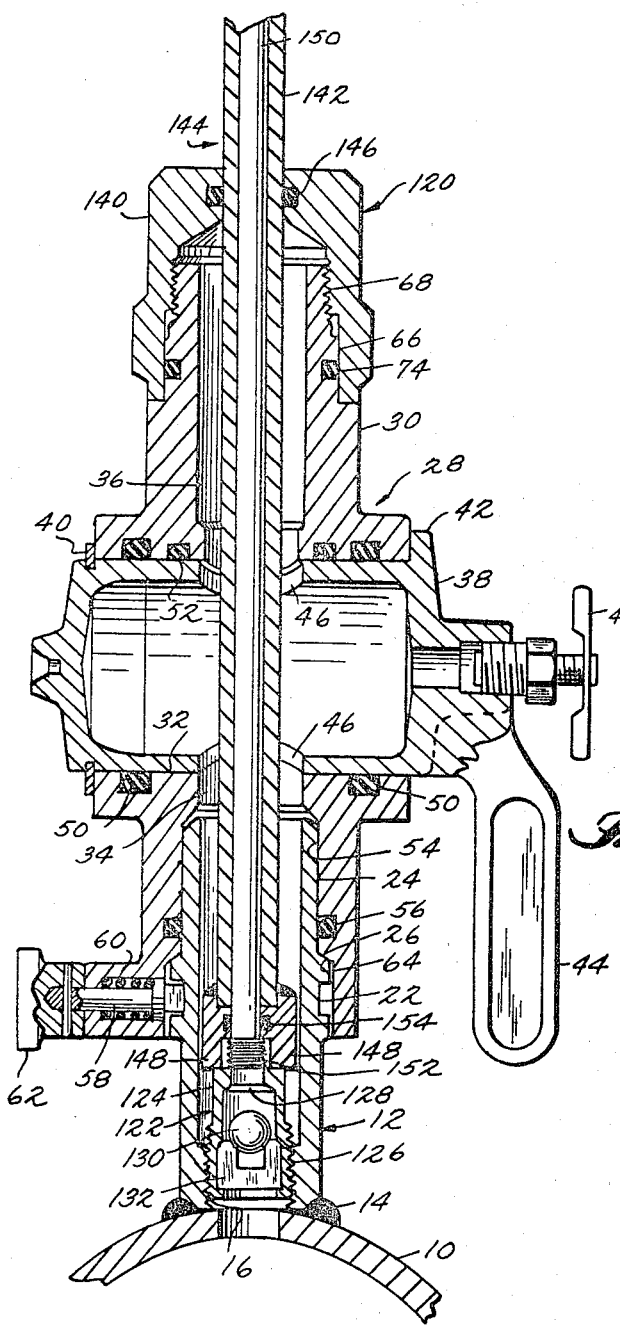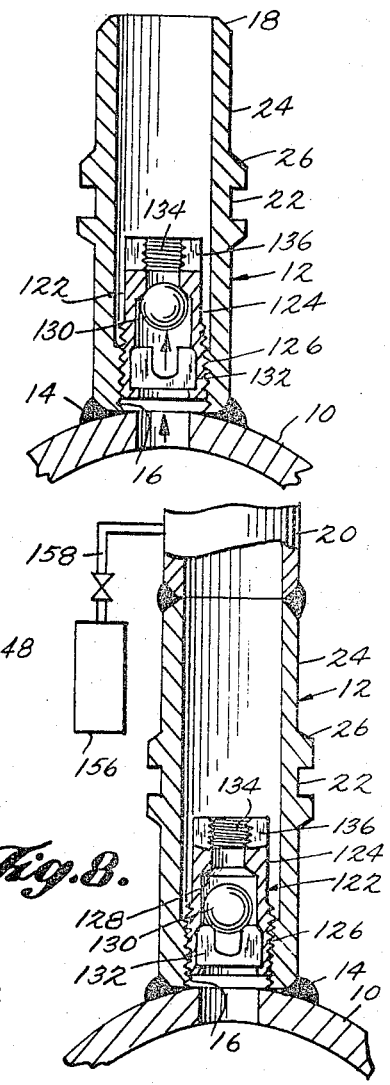
Fig. 6. Fig. 7. Fig. 8.
INVENTORS
WILBUR R. LEOPOLD, JR.
JOHN J. SMITH
LAWRENCE F. LUCKENBILL
BY
ATTORNEYS

3,272,033
DRILLING APPARATUS FOR CONNECTING A SERVICE LINE TO A MAIN WITHOUT ESCAPE OF FLUID FROM THE MAIN TO THE ATMOSPHERE
Wilbur R. Leopold, Jr., John J. Smith, and Lawrence F. Luckenbill, all of Decatur, Ill., assignors to Mueller Co., Decatur, Ill., a corporation of Illinois
Original application Sept. 21, 1962, Ser. No. 225,194. Divided and this application Jan. 30, 1964, Ser. No. 341,183
2 Claims. (Cl. 77—40)

This application is a division of our copending application Serial No. 225,194, filed September 21, 1962, and now abandoned.

This invention relates to improvements in apparatus for connecting a service line to a street main without escape of fluid from the main to the atmosphere. More particularly, this invention relates to an improved fitting for connecting a service line to a main.

Fittings for connecting a service line to a main without escape of fluid from the main to the atmosphere are known in the art. In the past, however, all such fittings have been in the form of a service T having a through bore and a lateral outlet, with one end of the T, i.e., the inlet end of the bore, being adapted to be secured radially to a main and with the outlet being adapted to have a service line connected thereto. After the T is secured to a main and a service line is connected to the lateral outlet, one end of a valve through which various operations can be conducted as is well known in the art, is connected to the other or open end of the T bore. A fluid-tight drilling machine, of a character well known in the art, then is connected to the other end of the valve and operated downwardly through the valve and T bore to drill a hole in the wall of the main and establish service. Thereafter, the drilling machine is removed and replaced by apparatus well known in the art by means of which an exteriorly threaded plug is inserted through the valve and screwed into the open or other end of the T bore to prevent the escape of fluid to the atmosphere. Thereafter, the valve is removed and the outer end of the T may be provided with a conventional closure cap to form an additional seal.

While T's of this type, and known methods of using the same to connect a service line to a main, have been satisfactory, improvements can be made. For example, a service T is relatively expensive as compared to a simple nipple.

Accordingly, it is an object of this invention to provide an improved apparatus for connecting a service line to a main without escape of fluid from the main to the atmosphere.

It is another object of this invention to provide an improved and less expensive fitting for connecting a service line to a main.

It is a further object of this invention to provide a service nipple which embodies an excessive flow safety valve that serves not only to permit the nipple to be used to connect a service line to a main without escape of fluid to the atmosphere, but also thereafter to shut off service in the event of excessive flow caused by a fracture, a break or the like, in the service line beyond the valve.

As aforedescribed, it is known in the art to conduct drilling operations through a service T in the process of connecting a service line to a main. In the past, such drilling operations have given rise to difficulties because of the resulting chips which fall into the main and may become lodged in and impair the operation of various downstream devices, e.g., valves or pressure regulators, or else may be carried upwardly into the service line with similar attendant difficulties. Devices for collecting chips resulting from such drilling operations are known, but again, are susceptible of improvement.

Accordingly, it is an object of this invention to provide an improved assembly of a drill and chip collector which facilitates the drilling of a main in the operation of connecting a service line thereto.

Other objects and advantages of the invention will become apparent from the following description and accompanying drawings in which:

FIGURE 1 is a fragmentary vertical sectional view showing a nipple secured to the wall of a main in accordance with this invention;

FIGURE 2 is a view corresponding to FIGURE 1 but illustrating the connection to the T of an improved fluid-tight drilling apparatus embodying this invention;

FIGURE 3 is a view corresponding to FIGURE 2 but illustrating the operation of the drilling apparatus to drill a hole through the wall of the main;

FIGURE 4 is an enlarged fragmentary sectional view taken substantially on line 4—4 of FIGURE 3;

FIGURE 5 is an enlarged fragmentary perspective view, with parts cut away to illustrate details, of a drill and chip-collector assembly embodying this invention;

FIGURE 6 is a view corresponding to FIGURE 2 but illustrating the operation of inserting and fastening an excessive flow safety valve within the nipple;

FIGURE 7 is a view corresponding to FIGURE 6 but illustrating the condition of the valve after the inserting apparatus has been removed from the nipple; and FIGURE 8 is a view corresponding to FIGURE 7 but showing a service line connecting to the outer end of the nipple and the establishment of service.

Referring now to the drawings, there is shown in FIGURE 1 a portion of the wall of a street main 10, for example, a gas main carrying gas under pressure. In order to connect a service line, leading to a dwelling or the like, to the main 10 in accordance with this invention, one end of a nipple 12 is secured radially and exteriorly to the wall of the main. Such connection preferably will be made by welding, as shown at 14 in the drawing, but can be made by other methods known in the art, for example, by the use of a service clamp (not shown). The nipple 12 is provided with interior threads 16, preferably adjacent its inner end. The outer end of the nipple is provided with a configuration especially adapted to have a service line connected thereto. For example, the outer end of the nipple may be chamfered, as at 18, to facilitate butt welding thereto the correspondingly chamfered end of a service line 20, as shown in FIGURE 8. Inwardly of its outer end, the nipple 12 is provided with an exterior circumferential groove 22 and that section 24 of the exterior surface of the nipple, between its outer end and the groove, preferably is smooth and cylindrical for reasons later explained. Desirably, forwardly or inwardly of the smooth wall section 24, the nipple 12 is enlarged to provide a rearwardly or outwardly facing shoulder 26, and the outer circumferential groove 22 may be formed in such enlarged portion of the nipple so as to preserve the wall strength thereof.

Referring now to FIGURES 2 and 3 of the drawings, after the nipple 12 has been welded to the main 10, as shown in FIGURE 1, there is connected to the outer end thereof a valve 28 through which drilling and other operations can be conducted as later explained. Although various types of valves are suitable for this purpose, the valve shown is of the type disclosed more in detail in U.S. Patent 2,547,831 and also in the copending U.S. application of Floren et al. Serial No. 12,645. Rather briefly, the valve 28, shown best in FIGURE 6, is of the cylindrical rotary plug type having a body 30 provided with a cylindrical seat 32 intercepting diametrically disposed inlet and outlet passageways 34 and 36. A cylindrical valve plug 38 is rotatably received in the seat 32 and retained therein by a snap ring 40 engaged in an exterior circumferential groove in the plug and bearing against the valve body 30 at one end of the seat. The other end of the plug 38 is provided with a combined retaining and rotational limiting lug 42 which projects radially of the plug and overlaps and bears against the valve body 30 at the other end of the seat 32. Abutment members (not shown) project longitudinally from the valve body 30 in circumferentially spaced relation on opposite sides of the lug 42 for alternative engagement by the latter to limit rotation of the plug 38° to 90° in turning between valve open and valve closed positions. The plug is provided with a conventional operating handle 44 and preferably has a hollow interior provided with diametrically disposed ports 46 alignable with the inlet 34 and outlet 36 in the open position of the valve 28. The plug 38 desirably is provided with a conventional bleed valve 48 for ascertaining whether pressure exists in the interior of the plug. Preferably, the plug 38 is sealed to its seat 32 by O-rings 50 disposed in circumferential grooves in the seat, adjacent the opposite ends of the latter. Additionally, an O-ring 52 preferably is disposed in a circumferential groove in the seat 32 surrounding the outlet 36 and sealingly engaged with the opposed surface of the plug 38.

The inlet 34 of the valve body 30 is provided with an inner section 54 adapted to snugly receive the outer smooth section 24 of the nipple 12. A seal between the valve body 30 and the nipple 12 desirably is provided by an O-ring 56 disposed in a circumferential groove in the inlet section 54 and sealingly engaged with the opposed smooth surface of the nipple. The valve 38 is retained in assembled position with the nipple 12 by means of a locking pin 58 extending through a radial bore in a radially enlarged portion of the valve body 30 and into the groove 22 in the nipple. The pin 58 is constantly urged radially inwardly by a coil compression spring 60 interposed between an outwardly facing shoulder on the pin and an inwardly facing shoulder in the bore in the valve body 30. The outer end of the pin 58 has a retracting knob 62 affixed thereto. The outer end of the inlet 34 preferably is counterbored to provide an outwardly facing shoulder 64 engageable with the shoulder 26 on the nipple 12 to properly align the pin 58 with the groove 22. The boss containing the outlet 36 of the valve body 30 is provided with a section 66 having a smooth outer cylindrical surface merging, at its outer end, in exterior threads 68 of reduced diameter.

Connected to the valve 28 is drilling apparatus 70 having an elongated cylindrical body 72 provided at its lower end with interior threads engageable with the threads 68 on the valve body 30. A seal between the body 72 and the valve 28 preferably is effected by an O-ring 74 disposed in a circumferential groove in the section 66 of the valve body 30 and engaged with an opposed smooth interior surface of a skirt-like portion of the body 72 extending below the interior threads therein. The upper or outer end of the body 72 is provided with extended exterior threads 76 and with a guide bore for a boring bar 78. A seal between the body 72 and the bar 78 preferably is effected by an O-ring 80 disposed in a circumferential groove in the body bore and sealingly engaged with the bar. In order to rotate the bar 78, the outer end thereof is provided with a conventional ratchet handle 82 detachably secured to the bar by a nut 84 threaded onto its outer end. Adjacent the handle 82 the bar 78 is provided with an outwardly or rearwardly facing shoulder 86 against which is seated a thrust collar 88 having a pair of diametrically disposed pins 90 projecting radially therefrom for detachable engagement, by a bayonet joint, with the outer end of a feed sleeve 92, preferably exteriorly knurled and having interior threads at its lower end engaged with the threads 76 on the body 72. By reason of the foregoing construction, it will be seen that rotation of the sleeve 92, with the pins 90 engaged therewith, will serve to feed the boring bar 78 forwardly, while the latter can be rotated independently of the feed by the ratchet handle 82.

The lower or inner end of the bar 78 is provided with a noncircular, e.g., hexagonal, socket for reception of a complementary head 94 on the end of a drill shank 96. The head 94 may be detachably retained in the socket by a transverse locking pin 98. The drill shank 96 is cylindrical for the major portion of its length and terminates, at its inner end, in a somewhat enlarged noncircular section 100, e.g., hexagonal in cross-section, as shown in FIGURES 3, 4 and 5. Inwardly beyond the section 100 is a conventional circular or cylindrical twist drill 102, of a major diameter greater than that of the minor transverse dimensions of the section 100 to provide upwardly or rearwardly facing shoulder portions 104. The drill 102 is provided with conventional spiral chip-collecting flutes 106. While it will be realized that the shank 96 and drill 102 may be made in one piece, they are illustrated in the drawings as being formed in two pieces, with a threaded connection therebetween, i.e., the rearward end of the drill terminating in a reduced exteriorly threaded stem 108 receivable in a correspondingly interiorly threaded socket in the lower end of the noncircular section 100, so that the shank constitutes a drill holder.

Snugly enclosing and of a length greater than the drill 102 is a sleeve-like chip-collector 110 having exterior threads 112 on its lower or inner end adapted to engage with the threads 16 in the nipple 12. At its upper end, the interior of the chip-collector 110 is reduced and provided with an interior noncircular configuration 114 complementary to that of the section 100 on the drill shank 96 and with downwardly or forwardly facing shoulder portions 116. When the noncircular sections 100 and 114 are engaged, as shown in FIGURE 2, the chip-collector 110 extends beyond the tip of the drill 102, and the drill and the chip-collector may be rotated as a unit by the boring bar 78. In this engaged position of the sections 100 and 114, it will be seen that the chip-collector 110 is prevented from advancing further relative to the drill 102 by means of the interengagement of the shoulders 104 and 106. In order to normally retain the sections 100 and 114 of the drill shank 96 and chip-collector 110 in engagement, a coil compression spring 118 surrounds the drill shank 96 and engages against the end of the boring bar 78 and the upper or outer end of the chip-collector.

In order to operate the foregoing apparatus to drill a hole in the main 10, the valve 28 is opened and the boring bar 78 advanced until the threads 112 on the chip-collector 110 engage with the threads 16 in the nipple 12. Whereupon the bar 78 is rotated to thus rotate the chip-collector 110 and screw the same into the nipple threads 16. Thereafter, the boring bar 78 is pushed downwardly sufficiently to disengage the noncircular sections 100 and 114 on the drill shank 96 and on the chip-collector 110, as shown in FIGURE 5 so that the drill 102 can be rotated independently by the bar, and advanced by the feed sleeve 92, to drill a hole in the main 10, as shown in FIGURE 3.

After a hole has been drilled in the main 10, as aforedescribed, the boring bar 78 is retracted and manipulated until the interlocking sections 100 and 114 on the drill shank 96 and chip-collector 110 re-engage so that reverse rotation of the bar will unscrew the chip-collector from the nipple 12 and permit the chip-collector and the drill to be retracted sufficiently so that the valve 28 can be closed, as shown in FIGURE 2. Thereupon, the drilling apparatus 70 is unscrewed and removed from the valve 28. It will be seen that most, if not all, of the chips caused by the drilling operation will pass up or rearwardly into the flutes 106 in the drill 112 and be retained therein because of the snug fit of the chip-collector 110. Hence, removal of the drill 112 and chip-collector 110 as a unit prevents any chips from falling into the main 10. The flutes 106 in the drill 112 are long enough to receive substantially all the chips made in a drilling operation on the thickest wall pipe anticipated to be drilled. It also will be noted that the drill shank 96 is long enough to enable the chip-collector 110 to be pushed rearwardly sufficiently to uncover the full length of the drill flutes 106 for cleaning pipes therefrom.

Thereafter, by means of inserting apparatus 120, described more in detail hereinafter, an excessive flow safety valve 122 (FIGURES 6, 7 and 8) is inserted and fastened within the nipple 12. This valve 122 preferably is of the type shown in the U.S. patent to Jerman, 2,569,316, and includes a sleeve-like body member 124 provided with exterior threads 126 adapted to engage the nipple threads 16. Adjacent its outer end the body member 124 is interiorly reduced to form an inwardly facing valve seat 128 against which a ball valve 130 is adapted to seat. The ball valve 130 is of a diameter only slightly less than the interior diameter of the body member 124 inwardly of the valve seat 128 so as to provide a restriction to flow of fluid past the ball valve through the sleeve member 124, as later explained. Secured within the inner end of the body member 124 is a generally U-shaped permanent magnet 132 having the legs thereof extending toward the valve seat 128 so as to normally attract and hold the ball valve 130 out of engagement with the seat 128. The magnet 132 is generally flat in transverse section so as to provide for a flow of fluid on opposite sides thereof through the body member 124.

The attractive force of the magnet 132, the weight of the ball valve 130, and the size of the flow restriction between the ball and the interior of the body member 124 are so proportioned that the magnet normally retains the ball valve unseated when flow of fluid through the body member does not exceed a predetermined rate, normally slightly in excess of the maximum flow demand of the service line 20. On the other hand, if the flow exceeds the predetermined rate and thus causes a pressure drop across the ball 130 with a resulting seating force thereon greater than the attractive force of the magnet 132 plus the weight of the ball 130, the latter will be forced off of the magnet onto the valve seat 128 and thus shut off flow of fluid through the body member 124. The ball valve 130 will remain seated until the seating pressure differential thereacross is reduced sufficiently to allow the magnet 132 plus the weight of the ball valve to unseat the latter. The outer end of the body member 124 is provided with interior threads 134 and with a transverse kerf 136 for reasons explained in detail hereinafter.

The excessive-flow safety valve 122 is inserted and fastened within the nipple 12 by inserting apparatus 120 of a type known in the art. This apparatus, shown in FIGURE 6, includes a cap-like body 140 having interior threads engageable with the threads 68 on the valve body 30 and with a skirt portion which seals with the O-ring 74 in the same manner as the body 72 of the drilling apparatus 70. Similarly, the body 140 is provided at its outer end with a guiding bore for the tube 142 of an inserting tool 144. A seal is effected between the body 140 and the tube 142 by means of an O-ring 146 disposed in a circumferential groove in the bore and sealing with the tube. At its lower end, the tube 142 terminates in two forwardly projecting tangs 148 adapted to engage in the transverse kerf 136 in the excessive-flow safety valve 122. Rotatably extending through the tube 142 is a retaining rod 150 having exterior threads 152 on its forward end engageable with the threads 134 of the excessive-flow safety valve 122 in order to retain the latter on the inner end of the tool 144. Preferably, a seal is effected between the tube 142 and the rod 150 is by means of an interior circumferential groove in the tube adjacent its inner or lower end in which is disposed an O-ring 154 which sealingly engages with the rod.

In order to insert and secure the excessive-flow safety valve 122 in position, after the drilling apparatus 70 has been removed from the valve 28, the body 140 of the inserting apparatus 120 is connected to the valve 28, and the latter is opened to permit the tool 144, with the valve 122 attached thereto, to be advanced through the valve 28 and into the nipple 12 for engagement with the threads 16 therein. Thereupon, the tube 142 is rotated to screw the valve 122 into the nipple 12, as shown in FIGURE 6. After the valve 122 is screwed tightly in place, the rod 150 is reversely rotated to disengage the tool 144 from the excessive-flow safety valve. At this time the inserting apparatus is removed from the valve 28, thus exposing the outer end of the valve 122 to atmosphere to allow gas to flow from the main 10 through the excessive-flow safety valve 122. Since such flow will be substantially unimpeded and, thus, excessive, it will immediately act to force the ball valve 130 off the magnet 132 and onto the valve seat 128 to thus shut off flow through the nipple 12, as shown in FIGURE 7. The amount of gas which will escape before the valve 122 is closed will be extremely small and, in fact, unappreciable, so that no danger whatever will exist as a result of escape of such a minute quantity of gas.

After the excessive-flow safety valve 122 has been closed as aforedescribed, the pin 58 is retracted to permit removal of the valve 78 and the service line 20 is connected to the outer end of the nipple 12, as shown in FIGURE 8. The service line is then run to the dwelling (not shown) or other consumption point. Thereafter, in order to establish service, i.e., to open the valve 122 in order to allow gas to flow from the main 10 through the nipple 12 and into the service line 20, the seating pressure differential across the ball valve 130 is reduced until the valve 122 opens. This may be accomplished in two ways.

First of all, the ball valve 130 may not be engaged fluid-tight with its seat 128, so that if the service line 20 and the house piping are tightly closed, the seepage of gas past the ball valve will gradually build up pressure within the service line to a point where the pressure differential across the ball valve is insufficient to maintain the same seated against the attractive force of the magnet 132 and the weight of the ball valve. Whereupon, the ball 130 will drop and be pulled away from its seat 128 by the attractive force of the magnet 132, thus opening the valve 122 and establishing service.

In the event that the ball valve 130 seats tightly and no leakage of gas takes place between the interengaged threads of the nipple 12 and the body member 124, fluid under pressure, such as compressed air from an appropriate source 156, may be introduced through an appropriate connection 158 into the service line 20, as shown in FIGURE 8, until the pressure therein is increased to a point where the pressure differential across the ball valve 130 is insufficient to maintain the same seated, as above-described. Whereupon the valve 122 will open and establish service. By operation of either of the above methods of opening the valve 122, the latter will be reset for shutting off flow to the service line 20 in the event of excessive flow through the valve for any reason, usually fracture or a break in the line beyond the valve.

It thus will be seen that the objects of this invention have been fully and effectively accomplished. It will be realized, however, that various changes may be made to the embodiment specifically shown and described to illustrate the principles of this invention without departure from such principles. Additionally, although the invention has been described with special reference to methods and apparatus for connecting a service line to a gas main, it will be realized that the invention is equally applicable for connecting any line to a hollow body containing fluid under pressure. Consequently, the terminology employed in the specification and claims is not to be construed as limiting, but only as illustrative. Accordingly, this invention includes all embodiments encompassed and within the spirit and scope of the following claims, having due regard for all equivalents.

What is claimed is:

1. In drilling apparatus the combination comprising: a drill having a shank of reduced diameter and a noncircular section at the forward end of said shank; a chip-collector comprising a sleeve snugly enclosing said drill and having exterior threads on its forward end and a reduced interior configuration at its rearward end complementary to said drill noncircular section and engageable therewith to restrain relative rotation between said drill and chip-collector, the forward end of said chip-collector, when so restrained, being located beyond the forward end of said drill; spring means engaged with said drill and chip-collector for yieldably urging the latter forwardly of the former; and interengageable shoulders on said drill and in said chip-collector to limit forward movement of the latter to a position wherein said configuration is engaged with said section.

2. The structure defined in claim 1 including a boring bar having a socket in one end thereof detachably receiving the free end of the shank and wherein the spring means is engaged with the forward end of said bar.

References Cited by the Examiner
UNITED STATES PATENTS
2,226,005  12/1940  Lodge _____ 77—40

WILLIAM W. DYER, JR., *Primary Examiner.*

F. S. HUSAR, *Assistant Examiner.*